(12) United States Patent  (10) Patent No.: US 6,311,797 B1
Hubbard  (45) Date of Patent: Nov. 6, 2001

(54) SELF CONTAINED COMPRESSED AIR SYSTEM

(76) Inventor: Larry J. Hubbard, 222 First St., Moncks Corner, SC (US) 29461

( * ) Notice: Subject to any disclaimer, the term of this patent is extended or adjusted under 35 U.S.C. 154(b) by 0 days.

(21) Appl. No.: 09/290,880

(22) Filed: Apr. 14, 1999

Related U.S. Application Data

(60) Provisional application No. 60/107,969, filed on Nov. 12, 1998.

(51) Int. Cl.⁷ .................................................. B60K 3/00
(52) U.S. Cl. ........................ 180/165; 180/304; 180/2.2
(58) Field of Search .......................... 180/2.2, 54.1, 180/302, 304, 165, 65.2; 123/200, 218, 231, 22; 417/178, 179

(56) References Cited

U.S. PATENT DOCUMENTS

| | | | |
|---|---|---|---|
| 3,323,498 | * | 6/1967 | Kraic et al. .......................... 123/218 |
| 3,925,984 | * | 12/1975 | Holleyman .......................... 180/65.2 |
| 4,019,475 | * | 4/1977 | Nuss .................................. 180/54.1 |
| 4,042,056 | * | 8/1977 | Horwinski .......................... 180/65.2 |
| 4,056,339 | * | 11/1977 | Doi et al. ............................ 418/178 |
| 4,077,746 | | 3/1978 | Reynolds . |
| 4,090,577 | * | 5/1978 | Moore ................................ 180/65.2 |
| 4,337,842 | * | 7/1982 | Spangler et al. .................... 180/302 |
| 4,370,857 | * | 2/1983 | Miller ................................. 180/165 |
| 4,590,767 | * | 5/1986 | Gardner .............................. 180/165 |
| 4,596,119 | * | 6/1986 | Johnson .............................. 180/165 |
| 4,631,000 | | 12/1986 | Burandt . |
| 4,736,879 | | 4/1988 | Yamada et al. . |
| 4,767,282 | | 8/1988 | Igarashi et al. . |
| 4,798,053 | * | 1/1989 | Changq .............................. 180/165 |
| 5,305,721 | * | 4/1994 | Burtis ................................. 123/218 |
| 5,324,173 | | 6/1994 | Wick, Sr. . |
| 5,431,551 | * | 7/1995 | Aquino et al. ...................... 418/179 |
| 5,484,269 | | 1/1996 | Vick . |
| 5,571,244 | * | 11/1996 | Andres ............................... 123/231 |
| 5,588,808 | | 12/1996 | De Santis . |
| 5,639,226 | | 6/1997 | Boutrup et al. . |

FOREIGN PATENT DOCUMENTS

| | | | |
|---|---|---|---|
| 2900519 | * | 7/1979 | (DE) ................................... 180/165 |
| 3228494 | | 2/1984 | (DE) . |
| 2150225 | * | 6/1985 | (GB) ................................... 180/302 |
| 6-42457 | | 2/1994 | (JP) . |
| 82/00615 | * | 3/1982 | (WO) .................................. 180/302 |

* cited by examiner

Primary Examiner—Frank Vanaman
(74) Attorney, Agent, or Firm—Richard C. Litman

(57) ABSTRACT

A self-contained compressed air system comprising a modified Wankel engine for driving various vehicles, mining gear boxes, pumping oil and water in oil fields and industrial plants, electrical power generators, and specifically, a 5-speed transmission for a front wheel drive vehicle. The compressor engine does not require electrical ignition and water-cooled components.

13 Claims, 3 Drawing Sheets

SELF CONTAINED COMPRESSED AIR SYSTEM

CROSS-REFERENCE TO RELATED APPLICATION

This application claims the benefit of U.S. Provisional Patent Application Ser. No. 60/107,969, filed Nov. 12, 1998.

BACKGROUND OF THE INVENTION

1. Field of the invention

The present invention relates to a self-contained air system based on a modified Wankel engine for driving a vehicle and the like.

2. Description of Related Art

The related art of interest describes various fluid intensifier or compressor devices and the like, but no pressurized air driving systems for vehicles. The related art will be described in the order of perceived relevance to the present invention.

U.S. Pat. No. 5,484,269 issued on Jan. 16, 1996, to Ralph L. Vick describes a fluid intensifier for increasing the pressure of a supplied hydraulic fluid and/or a gas with a single-acting drive piston with a lost motion connection. The piston element has an unequal area pump piston surface in the first end chamber and a small rear area surface in the small area pump piston chamber connected to a piston rod. The opposite end of the rod is connected to a drive piston in a drive cylinder. Other components of the system include a 3-way spring biased control valve and a 2-position 3-way pilot valve. The fluid intensifier apparatus is distinguishable for its triple surfaced piston and piston chamber structure.

U.S. Pat. No. 4,767,282 issued on Aug. 30, 1988, to Tadashi Igarashi et al. describes a fluid pressure booster including a pair of adjacent cylinders with pistons. A switch valve supplies line air pressure alternately to the drive chambers of the cylinders to reciprocate the pistons. The switch valve is provided with a spool stall preventive means which is arranged to suppress the pressing force on the valve body of the switch valve with the fluid pressure or biasing action of a spring until the valve body reaches the neutral position. The booster device is distinguishable for its dual piston operation.

U.S. Pat. No. 4,077,746 issued on Mar. 7, 1978, to Richard W. Reynolds describes a hydraulic fluid intensifier system having an axial piston pump motor unit with fluid control circuitry and porting. The system is driven by a hand pump. The system is distinguishable for its reliance on hydraulic fluid.

U.S. Pat. No. 5,639,226 issued on Jun. 17, 1997, to Morten Boutrup et al. describes a portable battery operated air pump for inflating bicycle tires. The air pump is distinguishable for utilizing a conventional piston to pressurize the air.

U.S. Pat. No. 5,324,173 issued on Jun. 28, 1994, to John R. Wick, Sr. describes a high pressure hydraulic fluid amplifier having a hydraulic motor for driving a single cam and follower in a piston chamber. The amplifier device is distinguishable for its requirement for utilizing hydraulic fluid and a piston.

U.S. Pat. No. 4,631,000 issued on Dec. 23, 1986, to Wesley A. Burandt describes a variable displacement hydraulic pressure intensifier for driving a piston in a hydraulic cylinder for controlling a surface implement of an aircraft. The intensifier apparatus is distinguishable for utilizing a hydraulic system driven by a piston.

U.S. Pat. No. 4,736,879 issued on Apr. 12, 1988, to Toshio Yamada et al. describes a pneumatic nailing tool with a pressure intensifier. The compressed air supplied to the tool automatically drives a piston to increase the air pressure for storage in a pressure chamber which is selectively connected or disconnected by a valve mechanism. The pressure intensifier system is distinguishable for its reliance on a drive piston.

U.S. Pat. No. 5,588,808 issued on Dec. 31, 1996, to Gerard J. De Santis describes a high level pump pressure multiplier designed to eliminate an accumulator in the pressurizing of water. A liquid pressure elevating mechanism consists of two identical cylinders wherein each cylinder contains a plunger operating within a first and second chamber separated by a barrier wall. A control mechanism accommodates the difference in degree of compressibility of the water to maintain the outlet pressure substantially constant. The pump pressure multiplier system is distinguishable for its limitation to pressurizing water.

German Patent Application No. 3,228,494 published on Feb. 2, 1984, for Konrad Ziesling describes an air driven pressure amplifier for performing automatic pumping action to a machine, e.g., clamping cylinders, shears, presses, by cutting in or out at predetermined maximum and minimum pressures using a stepped cylinder system. The amplifier device is distinguishable for its reliance on a piston arrangement.

Japan Patent Application No. 6-42457 published on Feb. 15, 1994, for Yoji Ise describes a pressurized fluid generating device for converting the revolution energy of a pressurized fluid revolution device to the reciprocating movement of a piston. The device is distinguishable for its reliance on a piston device.

None of the above inventions and patents, taken either singly or in combination, is seen to describe the instant invention as claimed.

SUMMARY OF THE INVENTION

The invention is a self-contained compressed air system, having as its major component a modified Wankel engine, e.g., MOP No. 12A, and solar panels for charging batteries to power a liquid propane driven motor. The system can be applied to drive a 5-speed transmission for a front wheel drive vehicle. Other applications will be noted later. The compressor engine requires no electrical ignition or water-cooled components.

Accordingly, it is a principal object of the invention to provide a self-contained compressed air system for propelling a vehicle and the like.

It is another object of the invention to provide a self-contained compressed air system based on a modified Wankel engine.

It is a further object of the invention to provide a self-contained compressed air system based on a modified Wankel engine absent a combustion cycle and including a solar panel.

Still another object of the invention is to provide a self-contained compressed air system based on a modified Wankel engine driving a 5-speed manual transmission for a front wheel drive vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention provides a front wheel drive vehicle as an example powered by a compressed air system based essentially on a modified Wankel engine and a solar panel with minimum reliance on natural gaseous fuels. This system thus benefits the environment in not emitting pollutants to the atmosphere.

Figure 1:
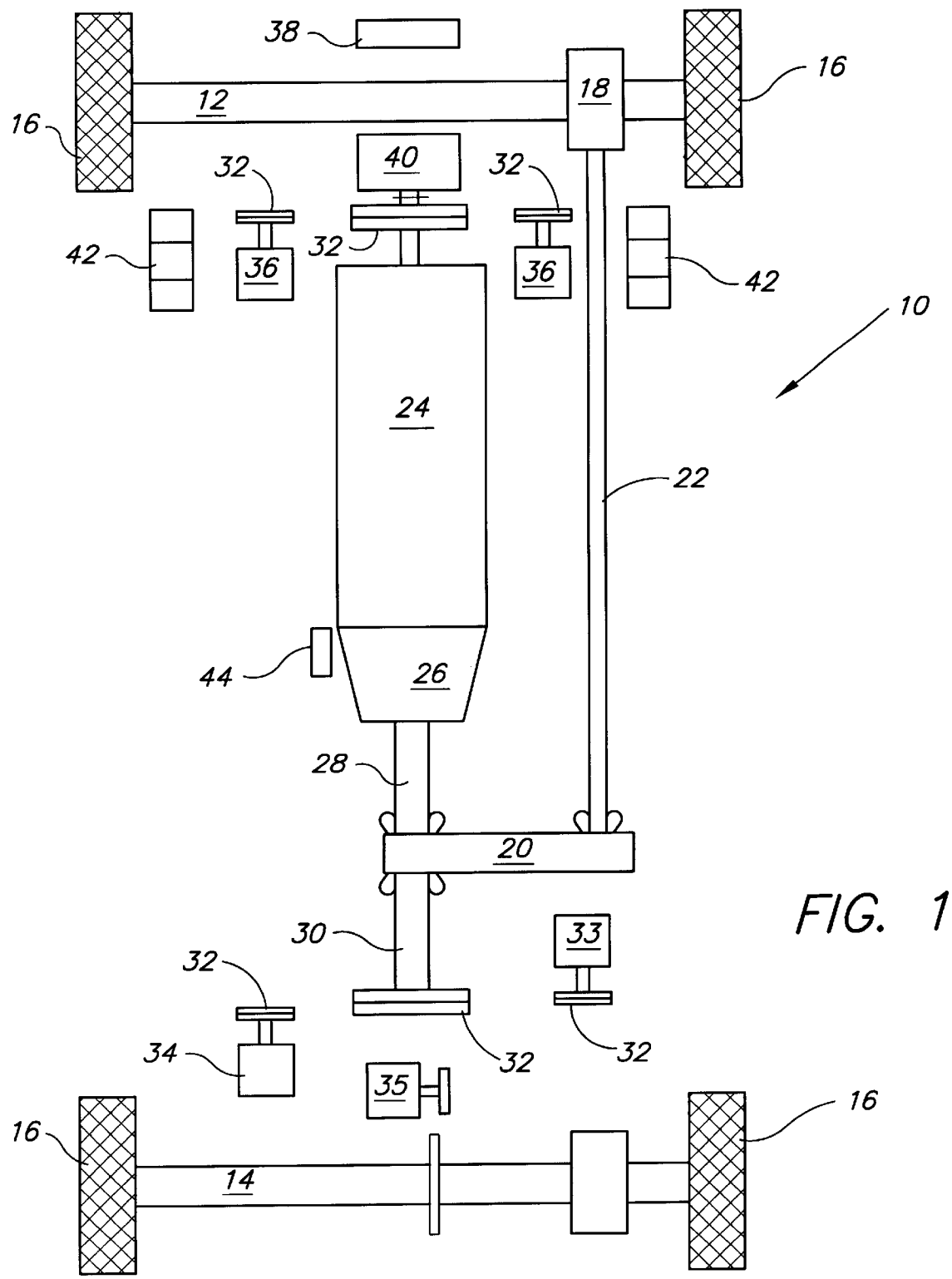
FIG. 1 is a schematic plan view of a self-contained compressed air system for propelling a front wheel drive vehicle according to the present invention.

FIG. 1 illustrates diagrammatically the driving components of a four-wheel drive vehicle 10 modified to a front wheel drive axle 12 and a rear wheel axle 14 with wheels 16. The axle 12 is driven by a differential gear 18 connected to a four-wheel drive gear transfer case 20 by a first transfer case drive shaft 22. The modified Wankel engine 24 ,i.e., rotary gas engine, drives a five-speed manual transmission 26 (including a clutch), transmitting power by a transmission drive shaft 28 to the gear transfer case 20 and a second transfer case drive shaft 30. The second transfer case drive shaft 30 has a pulley 32 which drives two 7.5 hp. air compressor pumps 33 and 34 by belts (not shown) connected to the respective pulleys 32. A third compressor pump 35 is connected to the rear axle 14 and is operated when the vehicle 10 is moving. Other conventional automotive elements are two alternators 36 with pulleys 32 receiving a driving force from the pulley 32 in front of the Wankel engine 24 and the air cooler 38 having a 26 cu. in. capacity. A 36 volt D.C. auxiliary drive motor 40 is hooked to the front of the engine 24. The alternators 36 are positioned on each side of the auxiliary drive motor 40 and supply direct electrical current to two battery banks 42. Each battery bank 42 consists of six 6 volt batteries and is disposed on opposite sides of the drive motor 40 for balance. A 12 volt D.C. starter motor 44, disposed adjacent the transmission 26, is the original starter motor of the modified Wankel engine 24 and is also utilized as an auxiliary starter motor.

The Wankel engine 24 has been further modified to utilize a teardrop shaped cut in the rotors (not shown) rather than the conventional triangular shape to enhance the efficiency of the collection of air in terms of cubic feet per minute. The rotors are coated with a ceramic composition. Additionally, the expansion chamber has been plated with chromium, and the apex seals and springs have been coated with a ceramic composition. These changes were made to eliminate the requirement for oil lubrication of the rotors resulting in less pollution in the operation of the modified Wankel engine 24.

Figure 2:
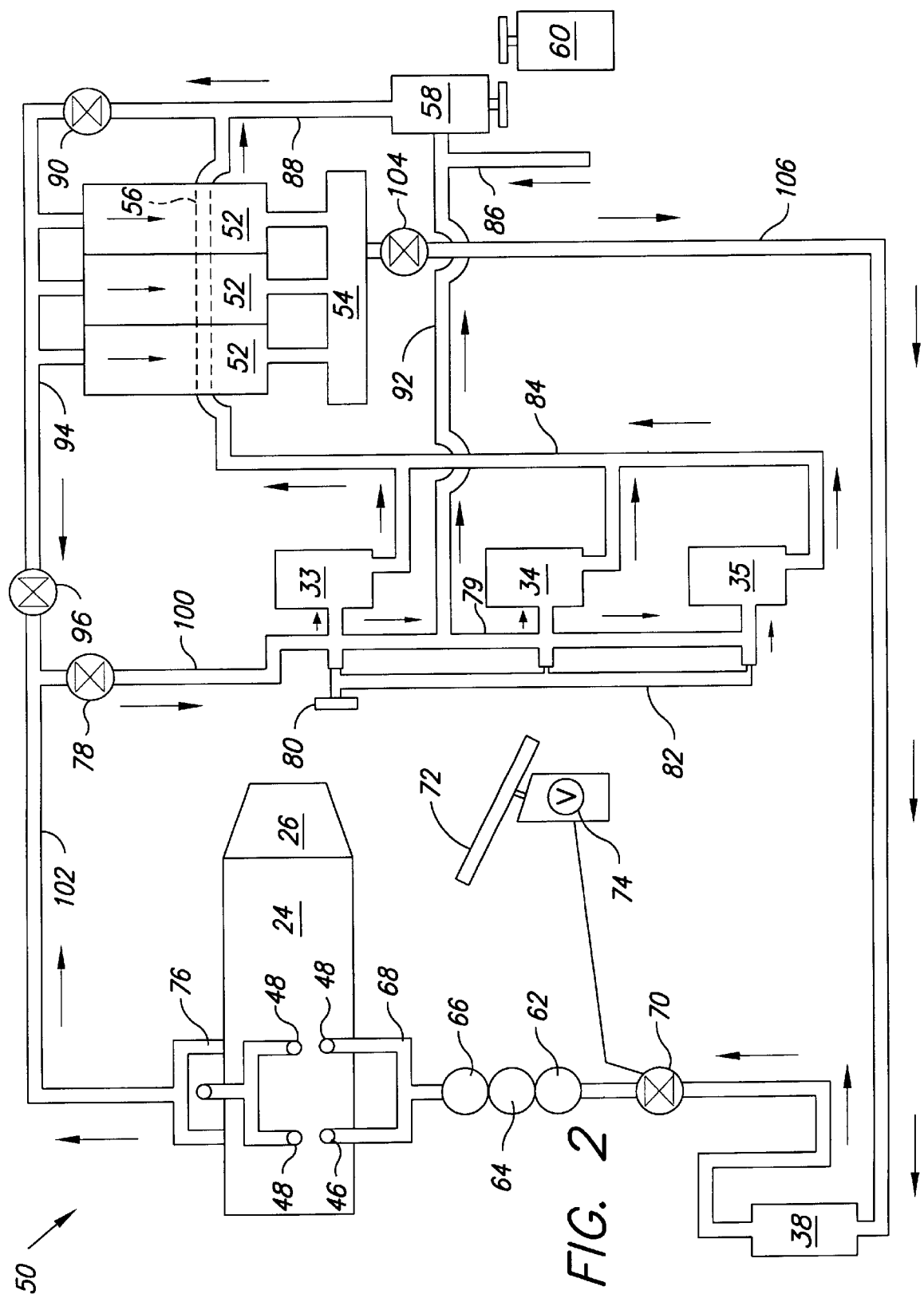
FIG. 2 is a schematic diagram of the closed loop air system of the present invention.

FIG. 2 is a schematic diagram of a closed loop pressurized air system for the modified Wankel engine 24. The engine 24 has been modified at the lower two spark plug holes for providing air intake throughbores 46 at a 30° angle downward. Throughbores 46 have been drilled to provide a 0.75 in. diameter NPT thread design for an air inlet header assembly (not shown). The carburetor intake side of the Wankel engine has been covered and provided with two 0.250 in. diameter NPT thread design throughbores. The upper two sparkplug holes become throughbores 48 which are provided with 0.375 in. diameter copper tubing passing over the engine to the carburetor intake side and act as a natural vacuum breaker that is created when the rotors are turning in the engine.

Turning to the schematic diagram of the closed loop air system 50 of FIG. 2, the air supply system 50 consists essentially of three 80 gallon capacity tanks 52, the three 7.5 hp. air compressor pumps 33, 34 and 35, and one 5 hp. air pump 58. Two of the air compressor pumps 33 and 34 are driven off the rear drive shaft 30 (FIG. 1) as noted above and hooked to a 12 volt electric clutch (hidden) in the transmission 26. The three compressor pumps 33, 34 and 35 will supply air directly to the header bank or manifold 54 by perforated conduit 56 that passes through each of the three air reservoir tanks 52. The three air compressor pumps 33, 34 and 35 will produce a maximum of 150 p.s.i. air pressure at 24 c.f.m. for each pump. Since the air supply to the engine 24 is rated at 50 c.f.m. and the pressure rating is in a range of 25 to 100 p.s.i., the engine 24 can run in a range from 50 to 3600 r.p.m.

A 5 hp. pump 58 serves as an auxiliary pump and is belt driven by an 11 hp. liquid propane gas engine 60 with an electric start mechanism. Air is drawn from the three 80 gal. air supply tanks 52 directly through the air cooler 38 (displaced for illustration), air regulator 62, air filter 64, and air lubricator 66 into the air inlet manifold 68 of the modified Wankel engine 24. An air throttle control valve 70 is controlled by a pedal 72 and its associated spool valve 74 to regulate the amount of air pressure and cubic feet per minute (cfm) flow to the modified Wankel engine 24.

The air exhausted from the modified Wankel engine 24 departs from the upper air exhaust throughbores 48 into an air exhaust manifold 76 and passes through conduit 102, a one-way check valve 78 and conduits 100 and 79 to the compressors 33, 34 and 35. The third compressor 35 not linked to the drive shaft 30 (see FIG. 1) is connected to the rear wheel axle 14 and operates only when the vehicle 10 is moving to accept external air at the intake conduit 80 and filtered at the common air filter 82.

The compressed exhaust air from the three compressors 33, 34 and 35 is collected in a conduit 84 which passes through the perforated conduit 56 in the three air tanks 52 and combines with fresh air entering from the inlet conduit 86 and exiting from the 5 hp. air pump 58 (belt driven by the 11 hp. propane gas engine).

A conduit 92 bleeds air from conduit 79, and thus feeds a mixture of fresh air from the air intake pipe 80 and exhaust air from conduit 79 to the 5 hp. air pump 58. The compressed air mixture then passes through conduit 88 and a one-way check valve 90 to enter the three 80 gal. air tanks 52.

A portion of the air is bled from the air entering the air tanks 52 passes through the check valve 96 and joins the exhaust gases coming from the engine 24 for a recycle through check valve 78 and conduit 100 to the compressors circuit.

The recycled air from the three 80 gal. air tanks 52 and the header bank 54 passes through a one-way check valve 104 in the conduit 106 back to the air cooler 38 and the modified Wankel engine 24.

Figure 3:
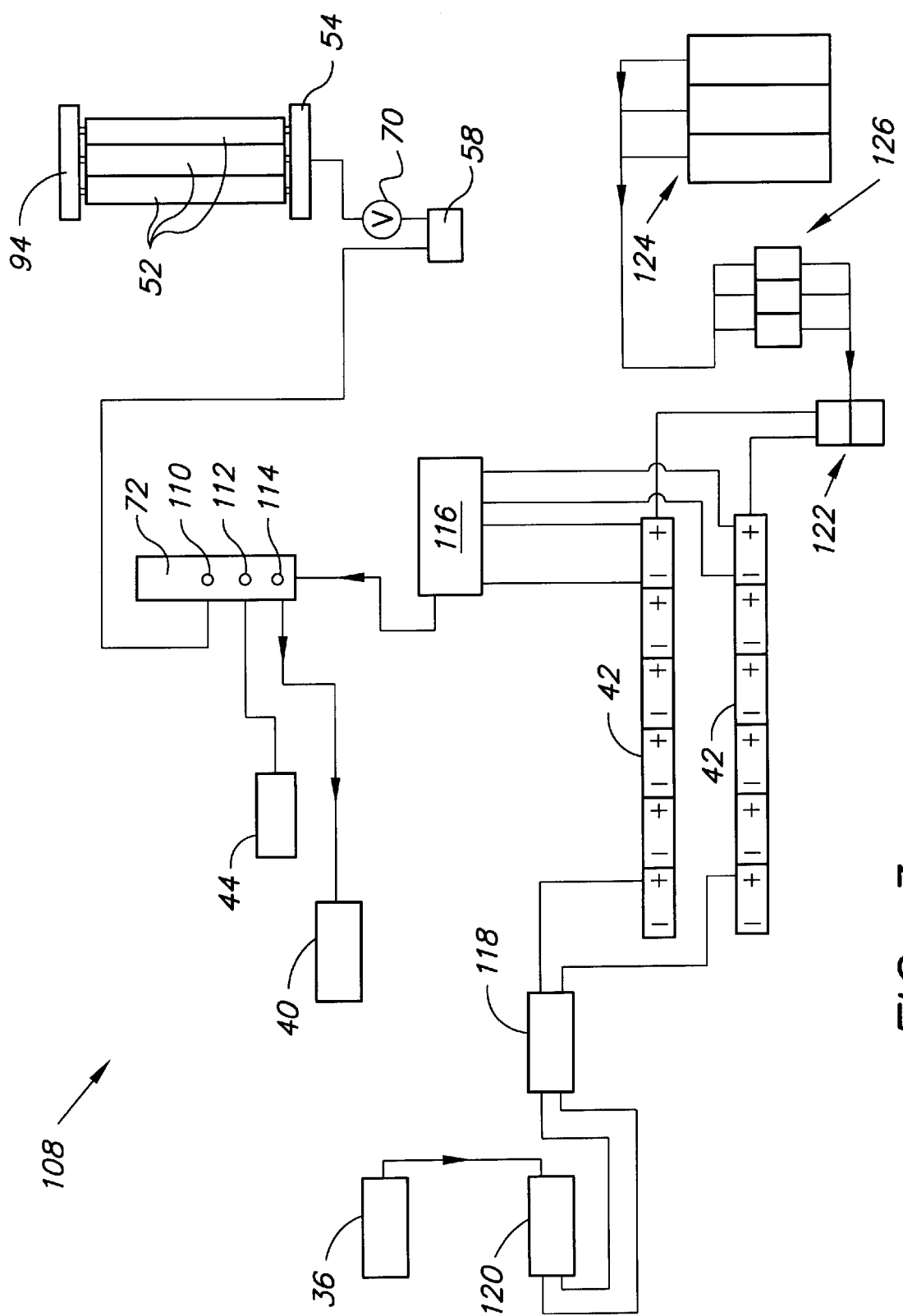
FIG. 3 is a schematic diagram of the electrical system of the present system including a solar panel.

Turning to FIG. 3, the electrical system diagram 108 is illustrated. The foot operated switches are controlled by the pedal 72 to sequentially operate on/off sprung push buttons 110, 112 and 114. Push button 110 activates the 5 hp. pump 58 to supply the three 80 gal. air tanks 52 (shown with the adjoining elements conduit 94 and the header bank 54) along with a main air line header control valve 70 which has a toggle switch control on the vehicle's dashboard (not shown) to permit air to be supplied to the engine 24. Push button 112 activates the starter motor 44. Push button 114 activates the 36 V. auxiliary drive motor 40.

A main power control panel 116 supplies the energizing electricity to the switches of the foot pedal 72. Panel 116 receives electrical power of 36 volts D.C. from each of the two battery banks 42. Each battery bank consists of six 6 volt batteries connected in series. One bank 42 energizes the 36 volt motor 40 while the other bank 42 is being recharged by utilizing the automatic charging switch 118.

The two alternators 36 (only one shown) produce 130 amperes each from the running of the modified Wankel engine 24 as regulated by the voltage regulator 120.

The battery banks 42 have a voltage regulator 122 for obtaining electricity from three solar panels 124 positioned on top of the vehicle 10 via three solar panel charge controllers 126 connected in parallel. Each 80 watt rated solar panel 124 produces 15.5 volts to supply a total of 46.5 volts at 8 amperes to the solar charge controllers 126.

Thus, an innovative compressed air system based on a modified Wankel engine has been presented to drive a vehicle, utilizing solar panels and a liquid propane motor. The vehicle can be a mass transit vehicle like trucks and buses. Other carriers can be a small helicopter and boats. Other uses contemplated are as follows.

(1) In the mining industry, the air motor can be used to drive gear boxes and the like underground to operate equipment without the danger of a fire hazard and the formation of gaseous exhaust.

(2) In the oil fields, the air motor can be used to pump oil or water when a fire hazard is a threat.

(3) In industrial plants, the air motor can be used to operate any type of equipment such as fire pumps previously driven by diesel motors.

(4) The air motor can be used to operate generators to produce electricity.

It is to be understood that the present invention is not limited to the sole embodiment described above, but encompasses any and all embodiments within the scope of the following claims.

I claim:

1. A compressed air system in combination with a vehicle, said combination comprising:
    a vehicle having a front axle, a rear axle and a pair of wheels for each said front and rear axle;
    a compressed air system operatively connected to said vehicle for powering said vehicle, said compressed air system including:
        a rotary engine having an air intake and an air exhaust;
        a plurality of air compressor pumps in closed communication with said air exhaust, said plurality of air compressor pumps compressing air from the air exhaust of said rotary engine to provide compressed exhaust air;
        a plurality of air tanks for accepting said compressed exhaust air;
        a cooler element for cooling said compressed exhaust air to produce cooled compressed exhaust air; and
        an air regulator, an air filter and an air lubricator connected in series and in closed communication with said cooler element, wherein the cooled compressed exhaust air is processed and recycled into said rotary engine through said air intake.

2. The combination according to claim 1, wherein said vehicle includes an auxiliary drive motor connected at one end of said rotary engine and a transmission connected at another end of said rotary engine, said drive motor extending towards the front axle and said transmission extending towards said rear axle, said transmission having a drive shaft extending therefrom.

3. The combination according to claim 2, wherein said drive shaft includes a pulley for driving two of said plurality of compressor pumps.

4. The combination according to claim 3, wherein said plurality of compressor pumps includes a third compressor pump operatively connected to the rear axle.

5. The combination according to claim 2, wherein said vehicle further includes a pair of alternators and a pair of battery banks, each of said pair being positioned on opposite sides of said auxiliary drive motor, wherein said pair of alternators supply direct electrical current to said pair of battery banks.

6. The combination according to claim 5, wherein said vehicle further includes solar panels for providing electrical charge to said pair of battery banks.

7. The combination according to claim 1, wherein said compressed air system further includes an air throttle control valve connected to said cooler element and said air regulator, said throttle control valve being electrically connected to a foot pedal for controlling operation of said rotary engine.

8. The combination according to claim 1, wherein each of said plurality of air compressor pumps has a 7.5 hp. capacity and is rated at a maximum air pressure rating of 150 p.s.i. at 24 c.f.m. of air.

9. A compressed air system for powering equipment, said compressed air system comprising:
    a rotary engine having an air intake and an air exhaust;
    a plurality of air compressor pumps in closed communication with said air exhaust, said plurality of air compressor pumps compressing air from the air exhaust of said rotary engine to provide compressed exhaust air;
    a plurality of air tanks for accepting said compressed exhaust air;
    a cooler element for cooling said compressed exhaust air to produce cooled compressed exhaust air; and
    an air regulator, an air filter and an air lubricator connected in series and in closed communication with said cooler element, wherein the cooled compressed exhaust air is processed and recycled into said rotary engine through said air intake.

10. The compressed air system according to claim 9, further including an auxiliary pump connected by a first conduit to said plurality of air compressor pumps and by a second conduit to said plurality of air tanks.

11. The compressed air system according to claim 10, further including a fresh air inlet conduit connected to said first conduit, wherein a portion of the compressed exhaust air from said plurality of air compressor pumps is combined with fresh air before entering said auxiliary pump.

12. The compressed air system according to claim 11, wherein said auxiliary pump is belt-driven by a propane engine.

13. The compressed air system according to claim 9, further including an air throttle control valve connected to said cooler element and said air regulator, said throttle control valve controlling air flow into said rotary engine through said air intake.

* * * * *